US008745271B2

(12) United States Patent  
O'Sullivan et al.

(10) Patent No.: US 8,745,271 B2  
(45) Date of Patent: Jun. 3, 2014

(54) RECOGNIZING MULTIPLE IDENTITIES OF SENDER AND SENDING THE MULTIPLE IDENTITIES TO RECIPIENT

(75) Inventors: Patrick O'Sullivan, Dublin (IE); Fred Raguillat, County Meath (IE); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 13/164,243

(22) Filed: Jun. 20, 2011

(65) Prior Publication Data

US 2012/0323959 A1 Dec. 20, 2012

(51) Int. Cl.  
*G06F 15/16* (2006.01)

(52) U.S. Cl.  
USPC .......................................................... 709/246

(58) Field of Classification Search  
USPC ................... 709/209, 206, 236, 246  
See application file for complete search history.

(56) References Cited

U.S. PATENT DOCUMENTS

| 7,567,936 | B1 | 7/2009 | Peckover et al. |
| 7,831,668 | B2* | 11/2010 | Deeds ........................... 709/206 |
| 2003/0233329 | A1 | 12/2003 | Laraki |
| 2004/0203619 | A1* | 10/2004 | Tissot ......................... 455/412.1 |
| 2008/0052364 | A1* | 2/2008 | Zhou .............................. 709/206 |
| 2009/0106383 | A1 | 4/2009 | Liang et al. |
| 2009/0144626 | A1* | 6/2009 | Appelman et al. ............ 715/727 |
| 2010/0211890 | A1* | 8/2010 | Cragun et al. ................. 715/757 |
| 2010/0257222 | A1 | 10/2010 | Hamilton, II et al. |
| 2010/0318614 | A1* | 12/2010 | Sager et al. .................... 709/206 |
| 2012/0323959 | A1* | 12/2012 | O'Sullivan et al. ........... 707/769 |
| 2012/0324020 | A1* | 12/2012 | O'Sullivan et al. ........... 709/206 |

* cited by examiner

*Primary Examiner* — Lance L Barry  
(74) *Attorney, Agent, or Firm* — Moore & Van Allen PLLC

(57) ABSTRACT

A method, device and computer program product for multiple identity recognition includes receiving a first communication from a sender addressed to a recipient using a first identity. A determination may be made as to whether the sender has multiple identities, and in response to determining that the sender has multiple identities, information regarding the identities of the sender is retrieved. The identities of the sender may be associated together so that the recipient may be provided an indication that the sender has at least one identity other than the first identity.

20 Claims, 2 Drawing Sheets

RECOGNIZING MULTIPLE IDENTITIES OF SENDER AND SENDING THE MULTIPLE IDENTITIES TO RECIPIENT

BACKGROUND

Applications where users have an identity, such as email, are prevalent in today's society. Many users have more than one identity on each application. When a user has more than one identity and sends a communication using separate identities, the recipient may be confused as to whether the sender of such communication are from separate users or if the same entity owns or controls all of the identities.

BRIEF SUMMARY

According to one aspect of the present invention, a method for multiple identity recognition includes receiving a first communication from a sender using a first identity. A determination may be made as to whether the sender has multiple identities, and in response to determining that the sender has multiple identities, information regarding the identities of the sender is retrieved. The identities of the sender may be associated together so that the recipient may be provided an indication that the sender has at least one identity other than the first identity.

According to another aspect of the present invention, a device for multiple identity recognition may include a processor and a memory associated with the processor. The processor may be configured for receiving a first communication from a sender using a first identity. The processor may further make a determination as to whether the sender has multiple identities, and in response to determining that the sender has multiple identities, information regarding the identities of the sender is retrieved. The identities of the sender may be associated together so that the recipient is provided an indication that the sender has at least one identity other than the first identity.

According to a further aspect of the present invention, a computer program product for multiple identity recognition may include a computer readable storage medium having computer readable program code embodied therewith. The computer readable program code may include computer readable program code configured for receiving a first communication from a sender addressed to a recipient using a first identity. The computer readable program code may include computer readable program code configured for determining as to whether the sender has multiple identities, and in response to determining that the sender has multiple identities, information regarding the identities of the sender is retrieved. The computer readable program code may include computer readable program code configured for associating the identities of the sender together so that the recipient is provided an indication that the sender has at least one identity other than the first identity.

BRIEF DESCRIPTION OF THE SEVERAL VIEWS OF THE DRAWINGS

Embodiments of the present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
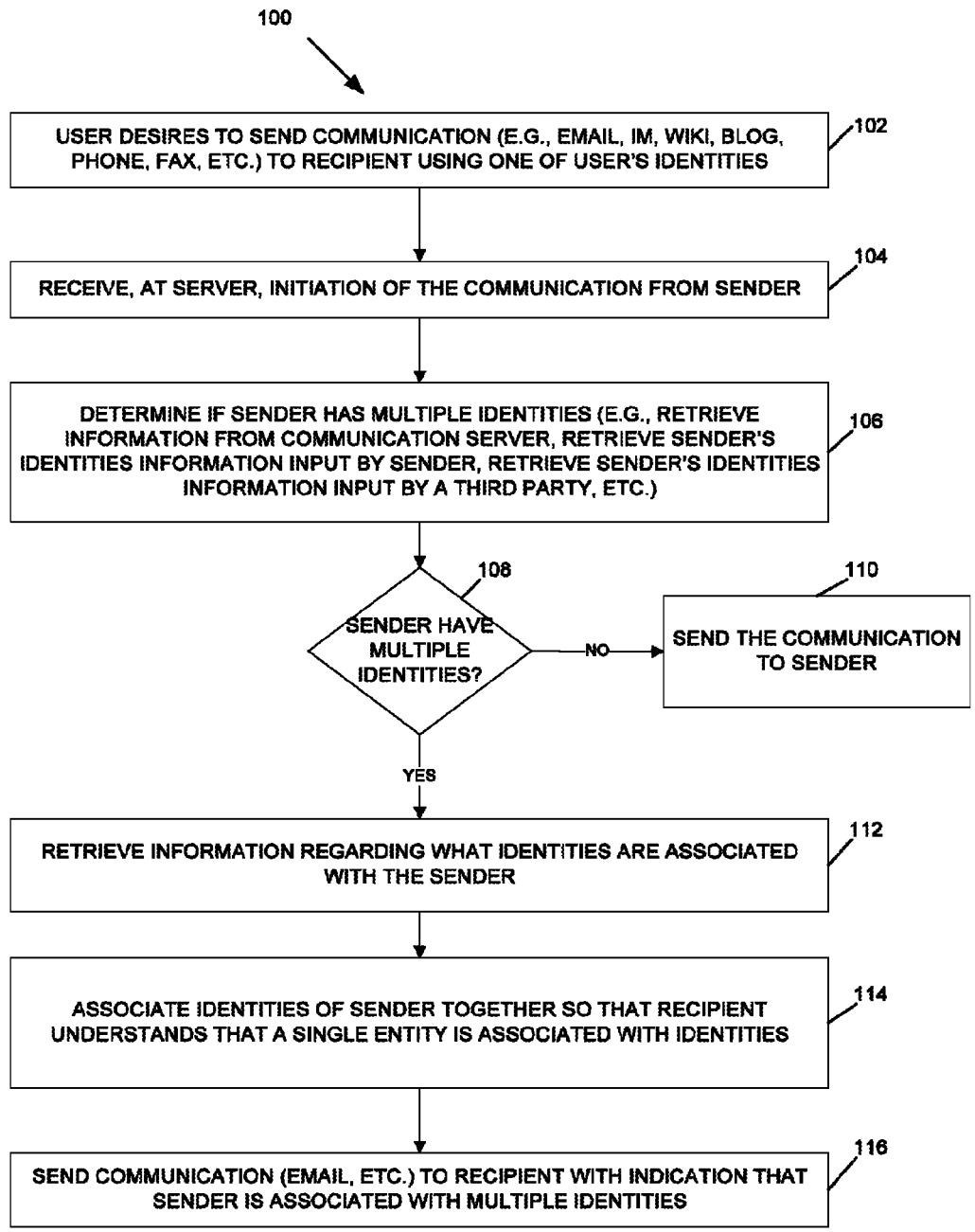
FIG. 1 is a flowchart of an example of a method for multiple identity recognition in accordance with an embodiment of the present invention

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, a class may define an abstract characteristic of a thing or object, such as a group of code or instructions for performing a particular operation or function. The abstract characteristics may include characteristics of the thing or object, for example attributes, fields or properties, behaviors, such as functions or methods that can be performed by the class. An object is a particular instance of a class. The set of values of the attributes of a particular object is the state of the object. The object includes the state and the behavior that is defined in the object's class. A method is an object's abilities or functions the object can perform.

In situations where a single entity, such as a user, has multiple electronic identities, determining that all of these multiple identities belong to the same entity can be a challenge. For example, Molly Severin may have several email addresses including maryseverin1@gmail.com, mollyseverin1@gmail.com, mseverin@usc.edu, etc. A user would like to know that the same entity (i.e., Molly Severin) is the same person that sends communications from each of these identities. The present disclosure addresses this issue and provides an appropriate and efficient solution, as discussed below with reference to FIGS. 1-2.

FIG. 1 is a flowchart of an example of a method 100 for multiple identity recognition in accordance with an embodiment of the present invention. In block 102, a user desires to send a communication to a recipient. As used herein, the term communication may refer broadly to any electronic form of communication, such as email, instant message, phonecall, facsimile, wiki entry, blog entry, other forms of providing website content, and/or any other way for a user to electronically communicate to another user. For example, a user could send emails using multiple email addresses and aspects of the present system allow the recipient to reconcile that these email addresses are owned by the same entity. Likewise, a user could post content (e.g., wikis, blogs, document libraries, etc.) under alternate identities and aspects of the present systems and methods may allow a reader (e.g., the recipient) of such postings to see that multiple identities are in play for a single user. The sending user may have multiple identities and the communication may be sent from at least one of the user's identities.

While some examples provided herein are directed to the communications being email or instant messages, it should be emphasized that the present disclosure is equally applicable to applications other than identities, such if a user has multiple IM accounts or multiple IDs for other applications (e.g., wiki, blog, phone applications or any other software application).

In block 104, the communication may be initiated from the sender and may be received at a server. The communication may be initiated by the sender using one of the sender's multiple identities. The server may be an email server, an IM server or any other server associated with the appropriate communication application used by the sender. The communication may be sent to the recipient by any means from a sender, such as via the Internet, intranet, LAN, WAN, etc.

In blocks 106 and 108, it may be determined if the sender sending the communication has multiple identities. This determination may be performed by sending an identity of the sender to a server and querying a database where such information is stored. Upon receipt of the query, the server will check database entries to determine if the sender's identity is found and if so, who the sender is and what identity(ies) are associated with the sender (i.e., the "entity"). If there is only one identity associated with that entity, then it is determined that the sender only has one identity and the method 100 may continue to block 110 where the communication is completed as usual, such as sending the email to the recipient. Otherwise, if more than one identity has been identified as belonging to the sender, the method 100 may continue to block 112.

In block 112, information is retrieved regarding what identities are associated with the sender. This information could be located on a communications server (e.g., email server, IM server, phone server, web server, etc.), on a database, on a personal computer or at some other stored location. The information can be stored on a server, database, other location, etc. via various ways. For example, the present system and method provides: a) a self learning capability to correlate the plurality of identities to one individual, b) a recipient-motivated capability to manually store a correlation, c) a social system and method where the knowledge of correlation stored by a first user is exploited by a peer users (e.g., a second user, a third user, a fourth user, etc.) who do not have to re-learn the same. A further discussion on how the identity/entity information gets stored on the server or database is discussed later with regard to FIG. 2.

In block 114, the identities of the sender are associated together with a single entity so that, upon receipt, the recipient will know that the single entity has multiple identities. For example, if Craig sends emails to Jane using multiple email addresses, the emails to Jane will show as coming from the same entity (i.e., Craig). This is also discussed in more depth below with reference to FIG. 2.

In block 116, the communication to the end user/recipient is then completed to the recipient with an indication that the sender is associated with the multiple identities. Such indication may be provided in various ways, such as providing the entity name in the header of the communication as well as what other identity(es) the entity is associated with. The indication may also be provided by stringing or lumping the communications in a single string, so that all communications that have been issued by the sender are all together in a single location. For example, if the sender has sent emails to the recipient using multiple email addresses, these emails may be placed in series together or in a common folder so that the recipient can immediately associate the multiple email addresses together. Yet another indication to the user of the sender's multiple identities may be to provide an alert, such as a pop-up box to notify the user that the sender has initiated communication using a separate identity and providing options as to whether the user would like to associate this sender with another sender in the recipient's directory of senders.

It should be noted that any of the elements or features of method 100 may be combined with any features or elements described in co-filed patent application having U.S. patent application Ser. No. 13/164,214, filed Jun. 20, 2011 and entitled "Name Resolution" to Patrick O'Sullivan et al. and assigned to International Business Machines, Inc., which is incorporated herein by reference in its entirety.

Figure 2:
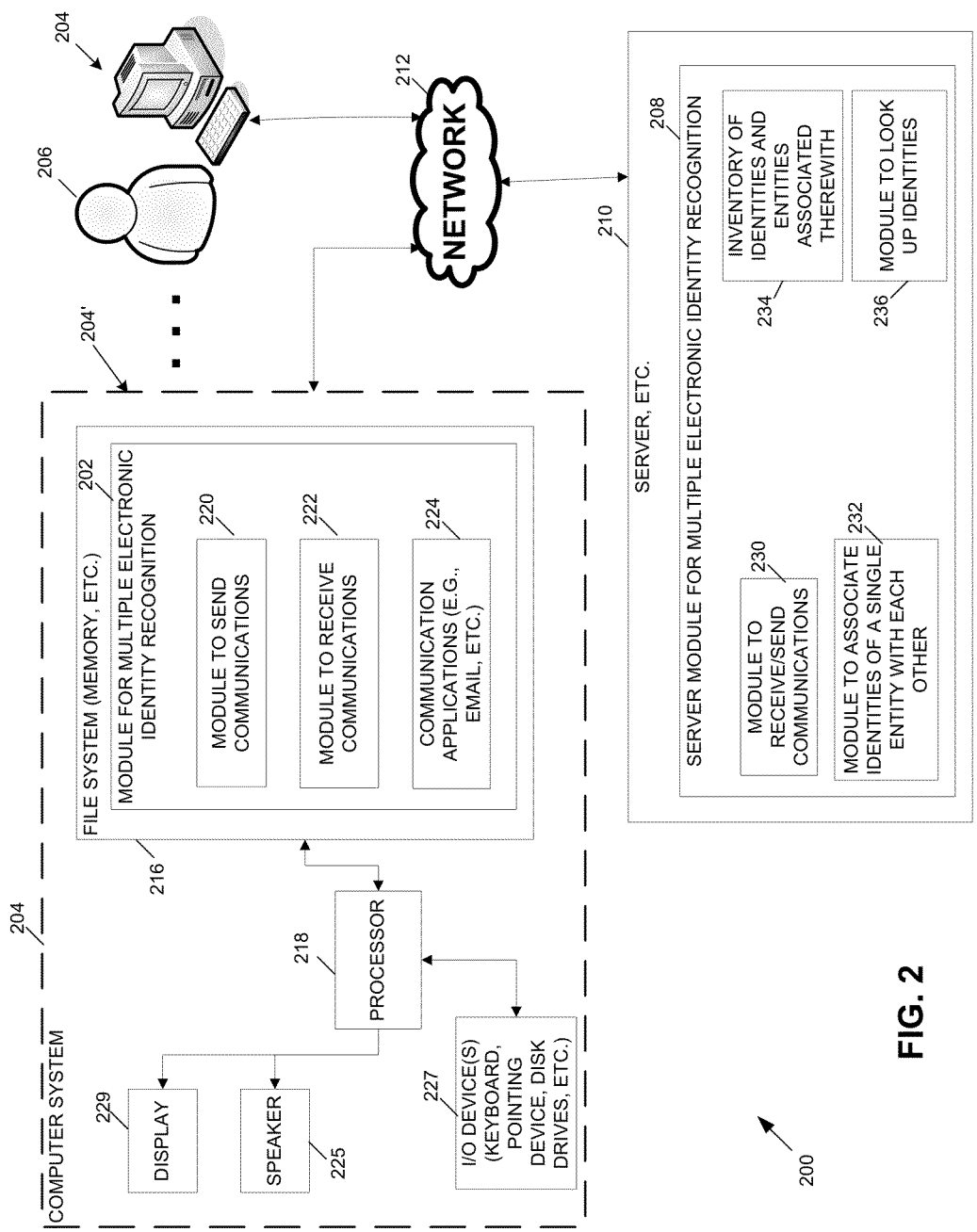
FIG. 2 is a block schematic diagram of an example of a system for multiple identity recognition in accordance with another embodiment of the present invention.

FIG. 2 is a block diagram of an example of a system 200 for multiple identity recognition in accordance with another embodiment of the present invention. The system 200 may include a module for multiple identity recognition module 202 operable on a computer system 204, or similar device of a user 206 or client. Alternatively, or in addition to the multiple identity recognition module 202 on the user's computer system 204 or client, the system 200 may include a multiple identity recognition module 208 operable on a server 210 (hereinafter "server multiple identity recognition module") and accessible by the user 206 or client 204 via a network 212. The method 100 may be embodied in or performed by the multiple identity recognition module 202 and/or the server multiple identity recognition module 208. For example, the method 100 may be performed by the multiple identity recognition module 202. In another embodiment of the invention, the method 100 may be performed by the server multiple identity recognition module 208. In a further embodiment of the present invention, some of the features or functions of the method 100 may be performed by the multiple identity recognition module 202 on the user's computer system 204 and other features or functions of the method 100 may be performed on the server multiple identity recognition module 208.

The multiple identity recognition modules 202 and 208 may be part of the server 210 or may be separate applications or modules that interface with the server. The network 212 may be the Internet, a private network or other network. Each computer system 204' may be similar to the exemplary computer system 204 and associated components illustrated in FIG. 2.

The multiple identity recognition module 202 and/or 208 may be a self contained system with embedded logic, decision making, state based operations and other functions that may operate in conjunction with communication functionality or other communication applications. The self contained system may allow businesses, individuals, services, locations, and/or the like to interact.

The multiple identity recognition module 202 may be stored on a file system 216 or memory of the computer system 204. The multiple identity recognition module 202 may be accessed from the file system 216 and run on a processor 218 associated with the computer system 204.

The multiple identity recognition module 202 may include a module to send communications 220 (hereinafter "communications initiation module"). The communication initiation module 220 allows the user to initiate an application 224, such as email, instant messaging, phone applications, website content updating application, etc., using the computer system 204. The communication initiation module 220 may be accessed or activated whenever the user desires to initiate some communication to a recipient and may call other modules such as applications 224 or GUIs as described below. The communication initiation module 220 also allows input of various preferences and/or settings to be entered and stored. The communication initiation module 220 may communicate with any module on the server 210.

The multiple identity recognition module 202 may also include a module to receive communications 222 (hereinafter "receiving communications module"). The receiving communications module 222 communicates with the server 210 to receive any communication as a recipient where the communication is initiated by another user that has multiple identities. As such, the computer 204 may act as both a communication sending device and a communication receiving device. Likewise, the server 210 may act as the communication sending server in the event that the user 206 is the initiating sender, but may also be the server of the communication recipient in the event the user 206 is simply receiving the communication. In the latter situation, the server 210 will then forward the received communication to the user computer system 204.

The user computer system 204 may also include a display 229 and a speaker 225 or speaker system. The display 229 may present the communication applications and may perform controlling and display of the multiple identity information (e.g., the multiple identities and the single entity associated therewith) as described herein. Any GUIs associated with the multiple identity recognition module 208 and applications 224 may also be presented on the display 229. The speaker 225 may present any voice or other auditory signals or information to the user 206.

The user computer system 204 may also include one or more input devices, output devices or combination input and output device, collectively I/O devices 227. The I/O devices 227 may include a keyboard, computer pointing device or similar means to control operation of communication applications and interaction features described herein. The I/O devices 227 may also include disk drives or devices for reading computer media including computer-readable or computer-operable instructions.

The server multiple identity recognition module 208 may include a module for receive/send communications 230 (hereinafter "send/receive communications module"). The send/receive communications module 230 may be configured to initiate, manage, process and/or complete one or more communications and/or one or more communication applications. The send/receive communications module 230 may be configured to communicate with any of the modules in the multiple identity recognition module 202 on the users computer 204, such as the receiving communications module 222, the communication initiation module 220 and/or the applications 224.

The server multiple identity recognition module 208 may also include an inventory of identities and entities associated therewith 234 (hereinafter "identity/entity inventory:"). The identity/entity inventory 234 may include one or more identities and the entities controlling each identity. The identity/entity inventory 234 may be stored locally on the server 210, the user's computer 204 and/or the user's computer readable storage medium in a database (not shown). The identity/entity inventory 234 may also be stored remotely on the network 212 in a database located on some other computer.

The user 206 or any other party may add identities and/or entities to the identity/entity inventory 234 at any time. According to one example, the user 206 can manually enter what entities are associated with which identities and can manually associate the multiple identities with the single entity.

According to another example, the communication server can compile various information about various senders, such as when the sender is setting up his/her communication account (e.g., an account that the sender uses to initiate the communication, such as an email account, instant message account, wiki account, blog account, etc.). Such information can be used to automatically determine if the user has multiple identities (as discussed above with regard to block 106 of FIG. 1) and if so, send information about the entity and multiple identity information associated with said entity to the recipient's communication server so that the recipient's server can associate the multiple identities with a single entity.

By way of another example, a third party (i.e., a party other than the sender and the recipient) can enter information about entities and their multiple identity information. This information can then be automatically shared among communication servers so that the eventual communication recipient's server will obtain the multiple identity information about an entity. Then, when a recipient receives a communication from a user that has multiple identities, the recipient's server will then recognize this and indicate the same to the recipient via the recipient's communication client application.

Other ways also exist to store the multiple identity information associated with a single entity. For example, the sending user can store this information on a communication server, which can then be distributed to one or more other communication servers so that when any communication server receives this stored information, the sender will automatically be identified to the user as the entity associated with multiple identities.

The above ways are helpful if the sender has already sent the recipient communications from multiple identities, because then the recipient will not wonder whether the separate identities are from separate entities, but will immediately know that these communications and identities are from a single entity.

The recipient's communication client application can indicate that a single entity is associated with multiple identities by any method. For example, the recipient's communication client application displaying that the multiple identities of sender to the user in a header of the communication (or at some location in the communication) to the user. The header may be in a header of an email, a header of website, etc. Another way to provide this information to the user may be by displaying all communications sent by a single entity (even if the entity has used multiple addresses) is to group these messages together in a single conversation string. Therefore, the user can easily refer back to all of the sending user's communications in a single lumped communication string.

Referring back to FIG. 2, the server multiple identity recognition module 208 may also include a module to look up identities 236 (hereinafter "identity lookup module"). The identity lookup module 236 may determine whether an identity is stored in the inventory of identities 234, and if so, then retrieve the entity associated with such identity and also may determine what other identities the entity is associated with. This information may then be provided to other modules on the server 210.

The server multiple identity recognition module 208 may also include a module to associate the identity of a single entity with each other 232 (hereinafter "identity/entity association module"). The identity/entity association module 232 may receive information from the identity lookup module 236 about a single entity having multiple identities and then appropriately associate such identity(es) with the known single entity, as was previously discussed. This associated information is then provided to the module to send/receive communications 230 which then may transmit the communication to the user computer system 204, a web server or some other computer.

The server multiple identity recognition module 208 may further include GUIs. The multiple identity recognition module 208 may present one or more predetermined GUIs to permit the user to define preferences and/or identity/entity information or any other information and/or settings. The GUIs may be predetermined and/or presented in response to the user indicating the user would like to enter information and/or settings. The predetermined GUIs may be generated by the server multiple identity recognition module 208 and may be presented on the display 229 of the computer system 204.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for multiple identity recognition, comprising:
   receiving, at a server, a first communication from a sender using a first identity, the first communication capable of being received by a recipient;
   determining that the sender has multiple identities;
   in response to determining that the sender has multiple identities, retrieving information regarding the identities of the sender;
   associating the identities with the sender so that the recipient is provided an indication that the sender has at least one identity other than the first identity; and
   sending the first communication to the recipient with the multiple identities of the sender identified in the first communication.

2. The method of claim 1, further comprising:
   receiving a second communication from the sender using a second identity, the second identity being addressed to the recipient; and
   providing an indication to the recipient that the first and second identities are associated with the sender.

3. The method of claim 1, wherein the first communication comprises an electronic communication.

4. The method of claim 1, further comprising:
   receiving input that the identities are associated with the sender; and
   storing the input in a database.

5. The method of claim 4, wherein the input is received from one of the recipient or the sender.

6. The method of claim 4, wherein the input is received from a party other than the recipient or the sender.

7. The method of claim 1, automatically retrieving information about identities associated with entities via communication servers.

8. The method of claim 1, wherein the determining that the sender has multiple identities comprises querying a database containing data indicating which identities are owned by which entity.

9. The method of claim 1, wherein the determining that the sender has multiple identities is automatically performed in response to receiving the first communication.

10. A device for multiple identity recognition, comprising:
    a processor;
    a memory associated with the processor;
    wherein the processor is configured for:
       receiving, at a server, a first communication from a sender using a first identity, the first communication capable of being received by a recipient;
       determining that the sender has multiple identities;
       in response to determining that the sender has multiple identities, retrieving information regarding the identities of the sender;
       associating the identities with the sender so that the recipient is provided an indication that the sender has at least one identity other than the first identity; and
       sending the first communication to the recipient with the multiple identities of the sender identified in the first communication.

11. The device of claim 10, wherein the processor is further configured for:
    receiving a second communication from a sender using a second identity, the second communication being addressed to the recipient; and
    providing an indication to the recipient that the first and second identities are associated with the sender.

12. The device of claim 10, wherein the processor is further configured for sending the first communication to the recipient.

13. The device of claim 10, wherein the processor is further configured for:
    receiving input that the identities are associated with the sender; and
    storing the input in a database.

14. The device of claim 10, wherein the processor is further configured for automatically retrieving information about identities associated with entities via servers.

15. The device of claim 10, wherein the determining that the sender has multiple identities comprises querying a database containing data indicating which identities are owned by which entity.

16. The device of claim 10, wherein the determining that the sender has multiple identities is automatically performed in response to receiving the first communication.

17. A computer program product for multiple identity recognition, the computer program product comprising:
    a non-transitory computer readable storage medium having computer readable program code embodied therewith, the computer readable program code comprising:
       computer readable program code configured for receiving, at a server, a first communication from a sender using a first identity, the first communication capable of being received by a recipient;
       computer readable program code configured for determining that the sender has multiple identities;
       computer readable program code configured for retrieving information regarding the identities of the sender in response to determining that the sender has multiple identities;
       computer readable program code configured for associating the identities with the sender so that the recipient is provided an indication that the sender has at least one identity other than the first identity; and
       computer readable program code configured for sending the first communication to the recipient with the multiple identities of the sender identified in the first communication.

18. The computer program product of claim 17, wherein the computer readable program code further comprises:
    computer readable program code for receiving a second communication from a sender using a second identity, the second communication being addressed to the recipient; and
    computer readable program code for providing an indication to the recipient that the first and second identities are associated with the sender.

19. The computer program product of claim 17, wherein the computer readable program code further comprises:
  computer readable program code for receiving input that the identities are associated with the sender; and
  computer readable program code for storing the input in a database.

20. The computer program product of claim 17, wherein the computer readable program code further comprises computer readable program code for automatically retrieving information about identities associated with entities via servers.

\* \* \* \* \*